J. HRIBAR & H. GIBSON.
CLUTCH.
APPLICATION FILED JAN. 22, 1917.
1,272,268.
Patented July 9, 1918.
2 SHEETS—SHEET 1.
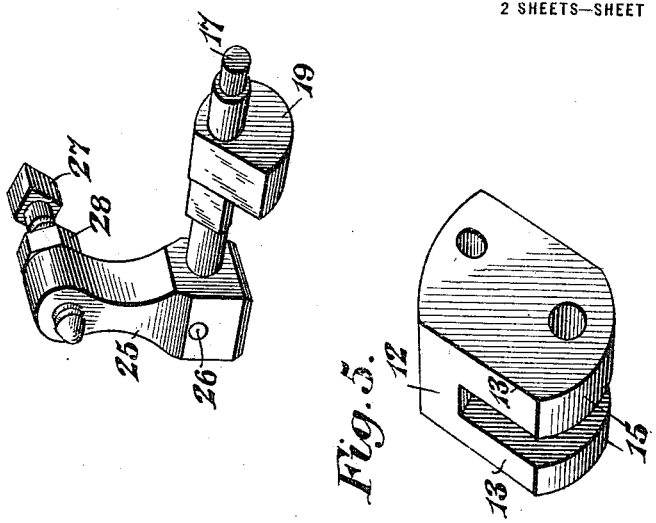
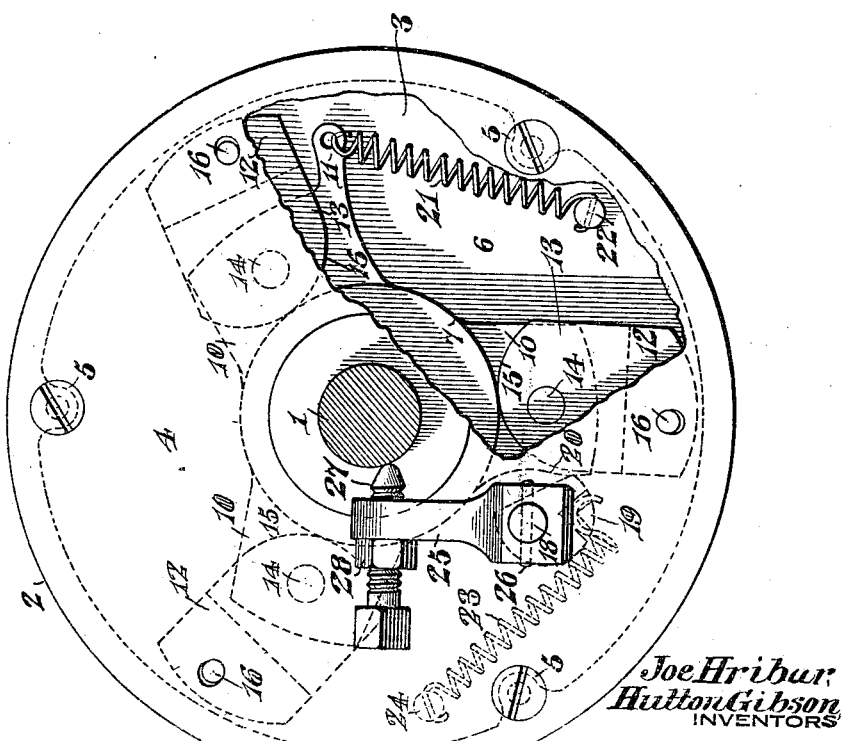

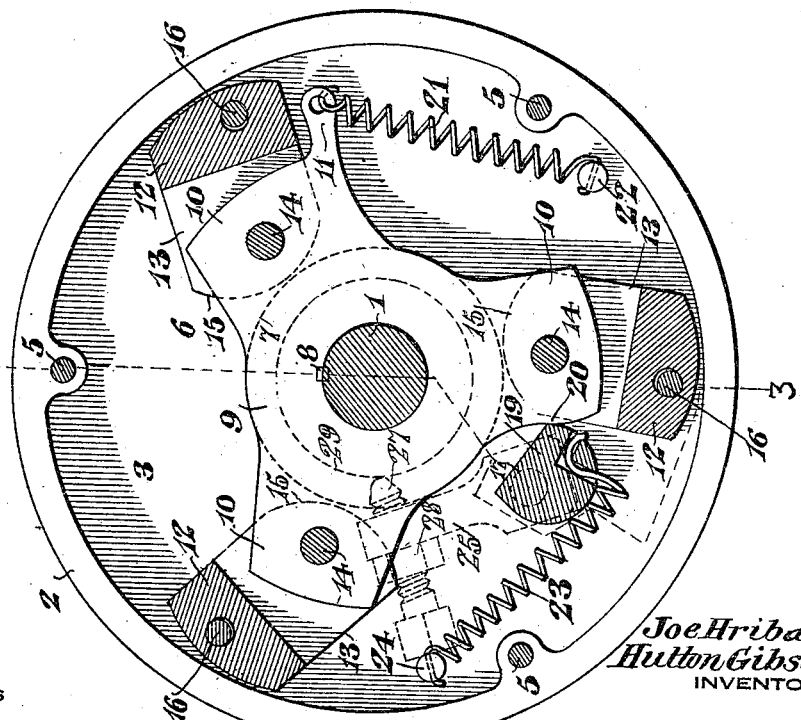

UNITED STATES PATENT OFFICE.

JOE HRIBAR, OF WAUKEGAN, AND HUTTON GIBSON, OF NORTH CHICAGO, ILLINOIS.

CLUTCH.

1,272,268.　　　Specification of Letters Patent.　　Patented July 9, 1918.

Application filed January 22, 1917.　Serial No. 143,801.

*To all whom it may concern:*

Be it known that we, JOE HRIBAR and HUTTON GIBSON, the former a subject of the Emperor of Austria and the latter a citizen of the United States, residing, respectively, at Waukegan and North Chicago, in the county of Lake and State of Illinois, have invented a new and useful Clutch, of which the following is a specification.

This invention has reference to clutches and its object is to provide a simple form of clutch interposable between a shaft and pulley or other structures with the clutch mechanism having a normal tendency toward the clutching position and requiring the application of a purposely directed force to release one structure from the other.

In accordance with the invention, which may for convenience of description be considered as applied to a shaft and pulley to connect and disconnect them, there is a clutch element or elements mounted on the shaft and made fast thereto and another clutch element or elements fast on the pulley and loosely connected to the shaft for engagement with the clutch element or elements fast on the shaft, with means imparting to the clutch elements on the pulley a normal tendency to engage the clutch elements on the shaft and with operating means for moving the clutch elements or structure on the pulley out of engaging relation to the clutch elements or structure on the shaft.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is an elevation of a pulley mounted on a shaft with the latter shown in cross-section and embodying the invention, a portion of one side of the pulley being broken away to reveal interior structure.

Fig. 2 is a section of the structure on a plane perpendicular to the axis of rotation of the pulley and about midway of the thickness of the pulley, showing some parts in elevation and indicating in dotted lines certain structures removed by the section.

Fig. 3 is a section on the line 3—3 of Fig. 2.

Figs. 4 and 5 are perspective views of details.

While the invention is applicable to various structures for interposition between moving parts to couple or uncouple them, it is shown in the drawings with reference to a shaft 1 and a pulley 2, the latter comprising two face plates 3, 4, respectively, connected together by screws 5 or in any other suitable manner. The interior of the pulley is made hollow, so as to inclose a chamber 6 to contain certain mechanisms to be described.

Within the chamber 6 are two collars 7 made fast to the shaft 1 by keys 8 or in any other suitable manner. The collars are arranged on opposite sides of a disk 9 mounted on the shaft to rotate loosely thereon between the collars 7. The disk 9 has radial arms or extensions 10 shown in the drawings as three in number, although the number of such arms may vary. The arms are equidistantly spaced one from the other in a circular series, and when three in number are disposed one hundred and twenty degrees apart. One of the arms is provided with an ear 11 for a purpose to be described. This ear is shown in the drawings as integral with the particular arm on which it is formed and in projecting relation thereto, but it will be understood that the ear may be otherwise constructed and arranged with respect to the arm carrying it. Straddling each arm 10 is a block 12 having legs 13 on opposite sides of the respective arm 10 and the arm and legs of the block straddling the arm are traversed by a pin 14 connecting the block and arm and constituting a pivot pin for the block. The legs 13 have their free ends 15 eccentrically curved with relation to the pin 14 and so related to the peripheral portions of the collars 7 that on being rocked about the axis of the pin 14 the curved ends 15 will engage and cramp against the collars 7 when the block 12 is rocked in one direction and move out of such cramping relation when the block is rocked in the other direction. Each block 12 at the end remote from the cramping surfaces 15 is mounted on a pivot pin 16 carried by the members 3 and 4 of the pulley 2, the arrangement being such that when the disk 9 is rotated about the shaft 1 the pins 14 are moved with relation to the pins 16 to cause the rocking of the blocks 12 to bring the cramping surfaces 15 into engagement with the collars 7 or to move them away from the collars 7.

Extending through the pulley 2 adjacent to one of the arms 10 is a spindle 17 journaled in the face plates 3 and 4 and extending beyond the face plate 4, such extension being indicated at 18. On the spindle 17 within the chamber 6 there is mounted a cam block 19 eccentric on the spindle in operative relation to the corresponding one of the arms 10 having a suitably curved edge 20 in the path of an appropriate portion of the block 19, so that on a rocking movement of the block 19 a rotative movement in one direction is imparted to the disk 9, this movement being against the normal action of a spring 21 secured at one end to the ear 11 and at the other end to a stud 22 on one of the face plates of the pulley, say, the plate 3 within the chamber 6. The cam block 19 has one end of a spring 23 fast thereto, while the other end of this spring is secured in a stud 24 fast to one face plate of the pulley, say, the face plate 3, and located within the chamber 6.

The tendency of the spring 21 is to rock the disk 9 with the arms 10 in a direction to carry the arm 10 adjacent to the cam block 19 toward the latter, and the tendency of the spring 23 is to rock the cam block 19 in a direction to carry it away from engaging relation to the edge 20.

Mounted on the extension 18 of the spindle 17 is a rock arm 25 shown as secured to the extension 18 by a pin 26, but the arm may be secured to the spindle extension 18 in any other appropriate manner. The arm 25 is in radial relation to the axis of rocking of the spindle 17 and is located exterior to the pulley, and at its outer end carries a set screw 27 threaded through the arm 25 and held in adjusted position thereon by a lock nut 28. The arm 25 projects from the spindle in a direction to carry the set screw into such relation to the shaft that if otherwise unimpeded the arm 25 will rock to bring the set screw 27 into engagement with the shaft 1.

Mounted on the shaft is a sleeve 29 slidable lengthwise of the shaft and provided with a circumferential groove 30 for the application of a fork or other actuating device permitting the sleeve to be moved lengthwise of the shaft and also permitting the sleeve to rotate with the shaft, or if need be to permit the shaft to rotate with relation to the sleeve. The end of the sleeve 29 toward the pulley has a tapered continuation 31 with the taper walls approaching the shaft so as to interpose between the shaft and the set screw 27. When the sleeve 29 is moved toward the pulley for a suitable distance, the taper continuation 31 engages that end of the screw 27 which is movable into engagement with the shaft and causes a rocking of the spindle 17 and cam block 19 in opposition to the tendency of the spring 23. This rocking movement results in causing the cam block 19 to engage the edge 20 in a manner to partially rotate the disk 9 so as to rock the blocks 12 about the pins 16 in a direction to move the cam edges 15 away from the collars 7. When the sleeve 29 is moved along the shaft away from the pulley the taper end 31 is carried out of the path of the screw 27, with the result that the spring 23 by its normal tendency causes a movement of the screw 27 toward the shaft and a corresponding rocking of the cam block 19 out of the path of the arm 10 provided with the edge 20, thus releasing the disk 9 to the action of the spring 21 and causing the disk to rock in a direction bringing the cam edges 15 into cramping relation to the collars 7, whereby the pulley is clutched to the shaft or the shaft to the pulley, as the case may be.

This clutching action, however, is a one-way clutching action. In the particular arrangement shown the pulley may be considered as rotating clockwise as viewed in Figs. 1 and 2. So long as the sleeve 29 is in the path of the screw 27, and considering the pulley as the drive member, the pulley remains disconnected from the shaft 1, and although the pulley be rotated by power applied to it, the shaft is not driven by the pulley. As soon, however, as the sleeve 29 is shifted out of the path of the screw 27, the spring 23 moves the cam block 19 in a direction to release the disk 9 to the action of the spring 21, which thereupon causes a rocking movement of the disk to bring the edges 15 of the blocks 12 into cramping relation to the collars 7 and the shaft is clutched to the pulley and participates in rotative movements thereof.

If the shaft 1 be the drive member, then the pulley becomes the driven member with the rotative movement of the shaft tending to assist the spring 21 in maintaining a firm gripping relation between the shaft and the pulley, while the sleeve 29 is out of the path of the screw 27.

The normal tendency of the clutch is toward the clutching position and the parts must be purposely moved from this position to disconnect the pulley from the shaft.

The pins 14 sustain the clutching strain, and are made amply heavy for the purpose. The pins 16 are simply holding pins, sustaining practically no strain, and hence may be made relatively light. If the shaft 1 be considered as rotating clockwise as viewed in Figs. 1 and 2, then the spring 21 need only bring the edges 15 into engagement with the collars 7 and there hold them, the clutching action being maintained by the rotative tendency of the shaft to bring the edges 15 into firmer engagement with the collars 7.

The set screw 27 provides means for taking up wear should such occur, and for setting the parts into proper relation to insure effectual grip between the clamping surfaces.

What is claimed is:—

1. In combination with a shaft, of spaced collars fast thereon, a pulley loose on the shaft, cam devices on the pulley in operative relation to the collars, and operating means for the cam devices in part on the shaft and in part on the pulley, with the part on the shaft in toggle connection with the cam devices.

2. The combination with a shaft, of spaced collars fast thereon, a pulley loose on the shaft, a series of cam devices on the pulley spaced about the collars with each cam device spanning the space between the collars, and operating means for the cam devices including a member loose on the shaft between the collars and connected in toggle relation with the cam devices.

3. The combination with a shaft and a pulley loosely mounted on the shaft, of means for clutching the pulley and shaft together, comprising a clutch structure fast on the shaft and another clutch structure in part loosely mounted on the shaft and in part carried by the pulley for engagement with the clutch structure fast on the shaft, the clutch structure carried by the pulley having means imparting to it a normal tendency to move to the clutching position and the shaft and pulley having coacting means for moving the clutch structure on the pulley in opposition to its normal tendency.

4. The combination with a shaft and a pulley loosely mounted thereon, of clutching means between the shaft and pulley, comprising collars fast on the shaft, a disk loosely mounted on the shaft and having arms projecting therefrom, clutch blocks pivoted to the disk and to the pulley and having cam portions in operative relation to the collars fast to the pulley, means imparting to the disk a normal tendency to move in a direction to cause the cam portions of the blocks to engage the collars on the shaft, and means carried by the shaft and pulley and associated with the disk to move the latter in opposition to its normal tendency to move the cam surfaces away from the collars.

5. The combination with a shaft and a pulley loosely mounted thereon, of clutching means between the shaft and pulley, comprising collars fast on the shaft, a disk loosely mounted on the shaft and having arms projecting therefrom, clutch blocks pivoted to the disk and to the pulley and having cam portions in operative relation to the collars fast to the shaft, means imparting to the disk a normal tendency to move in a direction to cause the cam portions of the blocks to engage the collars on the shaft, and means carried by the shaft and pulley and associated with the disk to move the latter in opposition to its normal tendency to move the cam surfaces away from the collars, said last-named means comprising a rockable cam block, a spring tending to move it in one direction, an arm for moving the cam block in the opposite direction and provided with an adjustable set screw, and a sleeve slidable on the shaft and having a taper end movable into and out of the path of the set screw.

6. The combination with a shaft and pulley loosely mounted on the shaft, with the pulley provided with an interior chamber, of collars fast on the shaft within the chamber in the pulley, a disk loosely mounted on the shaft between the collars and having arms projecting therefrom in the chamber in the pulley, blocks pivotally mounted within the pulley in straddling relation to the arms on the disk and having legs straddling the arms and pivoted thereto and terminating in cam edges in operative relation to the collars on the shaft, a spring in the pulley connected to the latter and to the disk for imparting to the disk a normal tendency to rock in one direction, a rockable cam block within the cam pulley in operative relation to one of the arms of the disk for moving the disk in opposition to its normal tendency, a spring connected to the cam within the pulley and tending to rock the cam in a direction to release the disk, a rock arm exterior to the pulley and connected to the cam block and carrying a set screw in position to engage the shaft exterior to the pulley, and a sleeve on the shaft movable lengthwise of the latter and having a taper portion for engaging the set screw to rock the cam block within the pulley in opposition to the spring controlling it.

7. A clutch comprising two concentrically disposed members rotatable one with relation to the other, clutch elements fast to the inner member, other clutch members on and movable with relation to the outer clutch member and to the clutch elements on the inner clutch member, means on and movable with relation to the inner clutch member and connected to the clutch elements on the outer clutch member and having a normal tendency to move the outer clutch elements into engagement with the inner clutch elements, and means carried by the clutch members for moving the outer clutch elements in opposition to their normal tendency to effect the unclutching of the clutch.

In testimony, that we claim the foregoing as our own, we have hereto affixed our signatures in the presence of two witnesses.

JOE HRIBAR.
HUTTON GIBSON.

Witnesses:
PERCY C. GIBSON,
AGNES O. JOHNSON.

Copies of this patent may be obtained for five cents each, by addressing the "Commissioner of Patents, Washington, D. C."